United States Patent [19]

Tegtmeier

[11] Patent Number: 5,064,248
[45] Date of Patent: Nov. 12, 1991

[54] HIGH LIFT DUMP BOX

[75] Inventor: Sheldon D. Tegtmeier, Colfax, N. Dak.

[73] Assignee: Tegtmeier & Sons, Inc., West Fargo, N. Dak.

[21] Appl. No.: 592,830

[22] Filed: Oct. 4, 1990

[51] Int. Cl.⁵ .............................................. B60P 1/34
[52] U.S. Cl. ...................................... 298/11; 298/13; 298/22 P; 298/18
[58] Field of Search ............... 414/332, 469, 470, 471, 414/419–422, 629, 631, 632, 640, 652, 653, 595, 598, 601, 602, 673; 298/10, 11, 17 B, 17 T, 17.5, 22 P, 17.7, 17.8, 18, 22 D, 13, 22 J

[56] References Cited

U.S. PATENT DOCUMENTS

| | | |
|---|---|---|
| 3,083,058 | 3/1968 | Walstrom et al. ................... 298/11 |
| 3,809,429 | 5/1974 | Channell ....................... 298/22 J X |
| 3,937,502 | 2/1976 | Gay ............................... 298/17.5 X |
| 4,019,780 | 4/1977 | Bishop ................................ 298/11 |
| 4,029,357 | 6/1977 | Bishop ................................ 298/11 |
| 4,327,945 | 5/1982 | Fowler ................................ 298/11 |
| 4,573,742 | 3/1986 | Tegtmeier ........................... 298/11 |
| 4,930,297 | 6/1990 | Schlueter ...................... 298/11 X |

Primary Examiner—Frank E. Werner
Assistant Examiner—Brian K. Dinicola
Attorney, Agent, or Firm—John W. Adams

[57] ABSTRACT

A high lift farm dump box particularly constructed to produce a stable unit when the box supporting sections are in extended position by providing a stabilizing cross bar which not only supports the dumping cylinders for the box but also provides a stabilizing connection between the lower ends of the upper strut sections and the upper ends of the next lower strut sections.

5 Claims, 2 Drawing Sheets

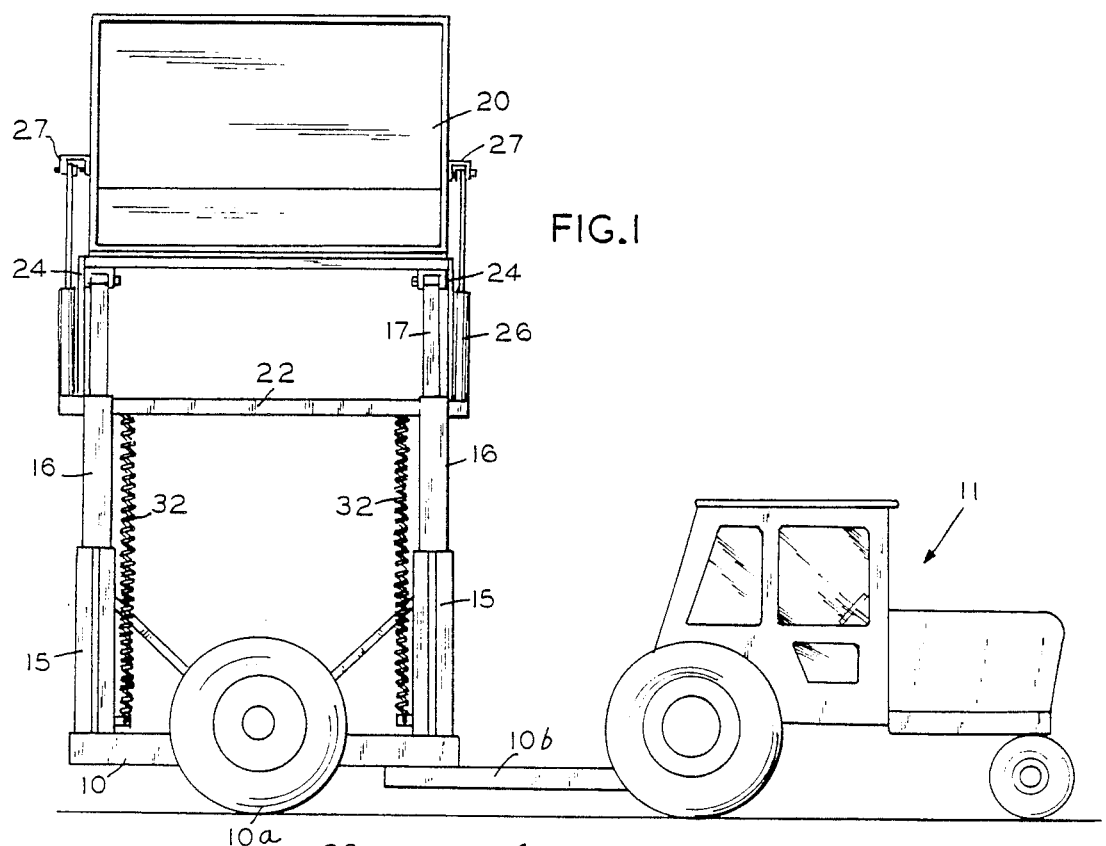
FIG.1
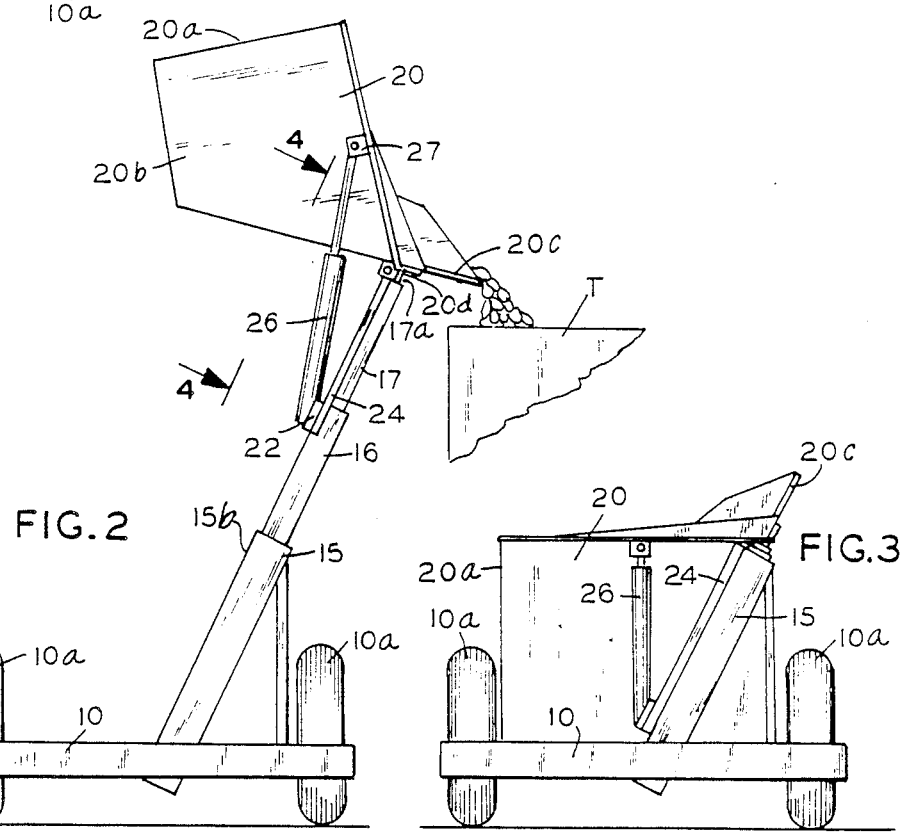
FIG.2
FIG.3

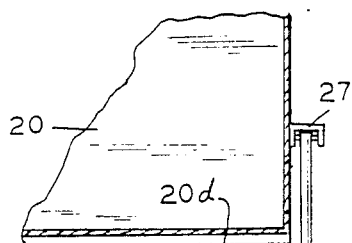
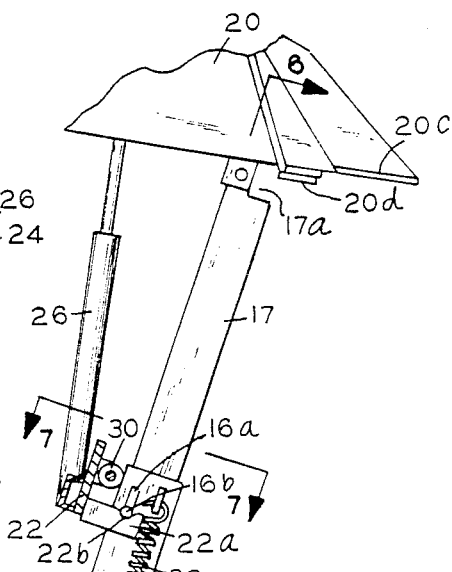
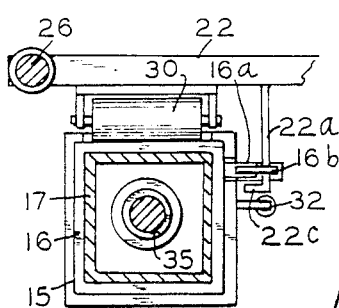
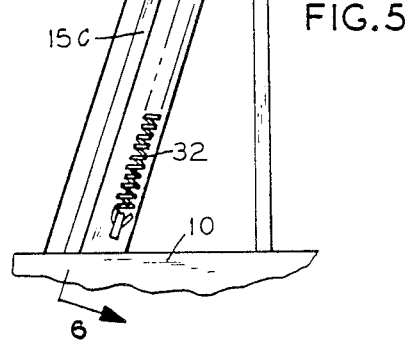
FIG. 4
FIG. 7
FIG. 5
FIG. 6

HIGH LIFT DUMP BOX

BACKGROUND OF THE INVENTION

In the past, high lift farm dump boxes have been relatively unstable in their raised dumping position. This problem is present in the structures disclosed in a number of prior art patents, which are the closest prior art known to applicant at this time.

The basic problems that exist in the manufacture of high lift farm dump boxes are the necessity for a unit that will carry its full load when in lowered position in a stable manner, while providing the required ground clearance of at least 10 inches up to 24 or even 30 inches under certain conditions, while still permitting the necessary extensiblility to elevate the dump box above the upper edge of a transport truck or trailer unit into which the load is being dumped. This upper elevation requirement is accentuated when a guiding lip is added along the discharge edge of the dump box.

All of the prior art structures are limited in their extensibility by the fact that the bending moment produced by the elevated load derives its total support from the stationary hollow strut member and its relationship to the upper elevated member which is supported solely by its overlapped relation within the bottom stationary support member. This limits the amount of extension permitted to the length of the stationary base strut member minus the required overlap between the base member and the single extensible member. In order to permit extension of the upper extensible member beyond the upper end of the stationary base strut member, it is necessary to provide a rigid connection between the upper extensible member and the extensible intermediate member so that when the upper member and intermediate member are in fully extended position they will be rigidly connected and will operate as a single unit.

It is also necessary to provide maximum dumping efficiency that the box dumping cylinders operate in a substantially vertical position and that they be mounted on an intermediate portion of the extended strut assembly. This is accomplished by providing an intermediate cross bar assembly connected to the upper strut section and having its ends extending laterally outwardly beyond the sides of the dump box. The intermediate cross bar provides a rigid interlocked connection between the lower ends of the extensible strut members and the upper ends of the intermediate strut members so that the two extended strut sections provide a rigid unit which produces the necessary stability when the dump box is in raised position.

The following is a list of the patents which are familiar to applicant herein, copies of which are enclosed herewith.

| PRIOR ART | | |
|---|---|---|
| U.S. Pat. No. | Issue Date | Patentee |
| 2,105,329 | January 11, 1938 | Orlowsky |
| 2,234,599 | March 11, 1941 | Johnston |
| 2,286,416 | June 16, 1942 | Holmstrom |
| 2,675,247 | April 13, 1954 | Meng |
| 2,812,210 | November 5, 1957 | Osborn |
| 3,083,058 | March 26, 1963 | Walstrom et al. |
| 3,205,011 | September 7, 1965 | Diem |
| 3,228,727 | January 11, 1966 | Paulson |
| 3,362,085 | January 9, 1968 | Clifford et al. |
| 3,633,971 | January 11, 1972 | Berky |
| 3,712,675 | January 23, 1973 | Schoenwald |
| 3,844,617 | October 29, 1974 | Kostman |

None of the above patents shows the stabilizing interlocking cross bar construction disclosed herein.

SUMMARY OF THE INVENTION

The present high lift dump box invention is embodied in the combination of elements included in the construction of the inclined strut assembly disclosed herein.

In the form of the invention illustrated, each strut includes three strut segments. The lower strut segment is a stationary base strut rigidly mounted on a suitable frame structure which in the form shown is mounted in a wheeled wagon box supporting unit. An intermediate strut segment is telescopically mounted in each of the base segments and is extensible during the elevating operation. A third segment is telescopically extensible within the second segment to permit the desired elevated position for the dump box mounted on the upper strut segments.

A stabilizing cross bar is provided to produce a substantially rigid joint between each upper strut segment and the upper end of the intermediate strut segment when the struts are in fully extended position. The stabilizing cross bar also provides support for the box-dumping cylinders and permits these dumping cylinders to be maintained in substantially vertical position.

DESCRIPTION OF THE DRAWINGS

FIG. 1 is a side elevation view showing a raised dump box embodying the invention and attached to a farm tractor.

FIG. 2 is a rear elevational view thereof.

FIG. 3 is a rear elevational view of the dump box in lowered position.

FIG. 4 is a sectional view taken substantially along the lines 4—4 of FIG. 2.

FIG. 5 is a rear elevational view showing the extended strut assembly embodied in FIG. 1.

FIG. 6 is a longitudinal sectional view showing the extended strut assembly illustrated in FIG. 5; and, FIG. 7 is a transverse sectional view taken substantially along the line 7—7 of FIG. 5.

DETAILED DESCRIPTION OF THE PREFERRED EMBODIMENT

FIG. 1 of the drawing illustrates a wheeled supporting frame 10 having the wheels 10a. The wheeled frame is connected to a suitable towing unit such as the tractor 11 by a conventional draw bar 10b. A pair of stationary hollow base strut members 15 are rigidly mounted in inclined relation on the frame unit 10 as best shown in FIGS. 2 and 3. A hollow extensible strut member 16 is telescopically received in each of the base strut members 15, and an upper extensible strut member 17 is telescopically received within each of the intermediate strut members 16. A dump box 20 is pivotally mounted on pivot pins on the top of the upper strut members 17 and has a back panel 20a disposed at substantially right angles to the bottom 20b.

A cross bar 22 is connected by a pair of links 24 to the upper end of the upper strut member 17 to form an upper frame unit as best shown in FIG. 4. The outer ends of the cross bar 22 provide an elevated pivotal support for a pair of dumping cylinders 26, the upper ends of which are pivotally connected to intermediate portions of the respective sides of the dump box 20 as by the brackets 27 and are maintained in substantially vertical position. The cross bar 22 has a pair of rollers 30 that are journaled for rotation on suitable shafts and are respectively aligned with the longitudinal top sloping surfaces of the intermediate strut members 16 as best shown in FIGS. 5 and 7. When the struts 16 and 17 are in extended relation, the cross bar provides interlocking latch connection between the upper end of intermediate strut member 16 and the lower end of the uppermost strut 17. This interlocking relationship is produced by a bracket member 22a fixed to the cross bar. The upper edge of each bracket 22a has an interlocking notch 22b formed therein as best shown in FIG. 5.

A laterally extending bracket 16a is fixed to each of the intermediate struts 16 and has an interlocking pin 16b fixed on the bottom edge thereof as best shown in FIGS. 5 and 6. This bracket and pin interlocking system forms a substantially rigid connection between the upper portion of the intermediate strut 16 and the cross bar 22. Thus, the cross bar 22 rigidly interconnects the two struts 16 and 17 when the upper strut 17 is in extended position and the bracket pin 16b is interlocked in notch 22b. Each bracket 22a is provided with a guiding flange 22c as best shown in FIG. 7. This flange 22a extends inwardly to overlap the bracket 16a and maintains the cross bar and roller in the desired alignment on the intermediate strut 16 when the two struts 16 and 17 are in fully extended position and also engages a flange plate 15c when the struts are in lowered position as best shown in FIG. 5.

A pair of tension springs 32 are respectively connected to the intermediate strut members 16 as by brackets 16c and connect the struts 16 to the respective bottom stationary strut members 15. The positive connection between the cross bar 22 and the upper ends of intermediate strut members 16 by means of the interfitted brackets 22a and 16a provides the required substantially rigid stability between the extended strut members 16 and 17. The springs 32 insure that the intermediate struts 16 will be lowered from extended position into the base strut members 15 before the upper strut members 17 are lowered into the intermediate strut members 16. The springs thus maintain the stable rigid connection between the two upper struts 16 and 17, until the struts 16 are fully retracted into the base strut 15.

As the two upper sections 16 and 17 are lowered as a unit into the stationary base struts 15, the rollers 30 will reach the upper ends of the base sections 15 and ride smoothly up onto the upper inclined surface on the ramps 15b provided at the top of upper surfaces of the stationary base struts 15.

A pair of main extension cylinder assemblies 35 are suitably mounted within the hollow extensible strut sections 15, 16, and 17 to produce the desired extension and contraction of the strut sections. Suitable connections and control valving of conventional design are connected with the tractor hydraulic system to provide the controlled operation of the hydraulic cylinders 26 and 35. The upper ends of the upper strut sections 17 are cut out to form stop recesses 17a which receive but stop plates 20d below the lip of the box to limit the dumping rotation of the box.

The problems with the prior art dump boxes have become critical in view of the use of dump boxes in the expanded agricultural market, which includes the use of trucks and trailers with higher sides as shown diagrammatically in FIG. 2. This problem is combined with the need for a low loading elevation of the box to facilitate receiving the discharge from the various harvesting machines. Frequently, a lip extension such as the lip plate 20c as shown in FIG. 2, is provided and extends approximately 10 inches outwardly beyond the normal dumping lip of the box 20. Depending upon the exact dumping angle of the box, this plate would lower the dumping edge by several inches. The dumping edge of the lip 10 overlies the upper edge of the body of the truck or trailer unit T into which the contents of the box are being dumped. It is very undesirable to have the dumping edge of the box or lip project down into the truck body below the upper edge of the side of the truck T. This could produce an inadvertent contact between the truck and the dump box and cause damage to both vehicles. By providing an increased, highly stable increment of high lift capability, this invention permits a lower center of gravity when the box is in down position and thus facilitates loading and stable transportation of a loaded dump box when in down position.

It will be seen that I have provided a relatively simple yet highly efficient stabilizing mechanism for high lift dump box extensible strut assemblies.

What is claimed is:

1. A high lift dump box comprising
a base structure, including a pair of hollow stationary strut members rigidly mounted thereon and disposed in inclined relation thereto,
at least a pair of extensible strut members having upper and lower ends and including a lower extensible strut member extensibly supported in each hollow stationary strut member with a corresponding upper extensible strut member being telescopically mounted in each lower extensible strut member,
interlocking stop means for positively locking each said lower extensible strut members and its corresponding upper extensible strut member when the upper extensible member is in a fully extended position to provide a substantially rigid extended strut assembly supported by said hollow stationary strut member,
a dump box having side panels and being pivotally mounted at the upper ends of the upper extensible strut members with means for pivotally moving the box from a normal lowered load receiving and carrying position into a dumping position when the extensible members are raised into fully extended position, and
means for forcibly projecting the two extensible members of each strut assembly into elevated position.

2. The structure set forth in claim 1 and a cross bar connected with the upper extensible strut members and located below the upper ends of the lower extensible strut members and means on said cross bar and said lower extensible strut members for positively interlocking the same to provide a substantially rigid connection between the upper extensible strut members and the lower extensible strut members when in extended position to produce a rigid connection between each pair of extensible strut members to stabilize the assembly when in raised position.

3. The structure set forth in claim 1 wherein said cross bar extends outwardly beyond the side panels of the dump box and
- a pair of dumping cylinders for dumping the box and supported at their lower ends on said cross bar and connected at their upper ends to the side panels of the box at a location to orient the cylinders in substantially vertical position.

4. The structure set forth in claim 1 wherein the dump box has a sloping front panel and a substantially straight rear side panel disposed in substantially vertical relation when in lowered position.

5. The structure set forth in claim 4 wherein the bottom of the dump box lies in a substantially horizontal plane when the dump box is in lowered position and is disposed at right angles to the plane of the rear panel of the dump box.

* * * * *